US012223101B2

(12) United States Patent
North et al.

(10) Patent No.: US 12,223,101 B2
(45) Date of Patent: *Feb. 11, 2025

(54) HARDWARE-BASED SECURITY AUTHENTICATION

(71) Applicant: TEXAS INSTRUMENTS INCORPORATED, Dallas, TX (US)

(72) Inventors: Gregory Allen North, Austin, TX (US); Per Torstein Roine, Oslo (NO); Eric Thierry Jean Peeters, Volente, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,928

(22) Filed: Oct. 5, 2023

(65) Prior Publication Data

US 2024/0028779 A1    Jan. 25, 2024

Related U.S. Application Data

(63) Continuation of application No. 17/962,627, filed on Oct. 10, 2022, now Pat. No. 11,783,097, which is a continuation of application No. 17/122,234, filed on Dec. 15, 2020, now Pat. No. 11,468,202.

(51) Int. Cl.
*G06F 21/85* (2013.01)
*G06F 13/28* (2006.01)
*G06F 15/78* (2006.01)

(52) U.S. Cl.
CPC ............ *G06F 21/85* (2013.01); *G06F 13/287* (2013.01); *G06F 15/7807* (2013.01)

(58) Field of Classification Search
CPC ..... G06F 21/85; G06F 15/7807; G06F 13/287
See application file for complete search history.

(56) References Cited

U.S. PATENT DOCUMENTS

| 5,752,077 | A  | 5/1998  | Yiu et al.    |
|-----------|----|---------|---------------|
| 9,471,769 | B2 | 10/2016 | Sitbon et al. |
| 9,985,959 | B2 | 5/2018  | Watanabe      |
| 10,824,766| B2 | 3/2020  | Desai et al.  |
| 11,468,202| B2 | 10/2022 | North et al.  |

(Continued)

FOREIGN PATENT DOCUMENTS

WO    2020002432 A1    1/2020

OTHER PUBLICATIONS

International Search Report for PCT/US2021/063000 mailed Mar. 31, 2022.

(Continued)

*Primary Examiner* — Zachary K Huson
(74) *Attorney, Agent, or Firm* — Carl G. Peterson; Frank D. Cimino

(57) ABSTRACT

A system includes a multiplexer, an input/output (I/O) pin, a logic circuit, and a control register. The multiplexer has multiple inputs, an output, and a selection input. The logic circuit is coupled between the multiplexer and the I/O pin. The logic circuit has a first input. The control register includes first and second bit fields corresponding to the I/O pin. The first bit field is coupled to the selection input of the multiplexer, and the second bit field is coupled to the first input of the logic circuit.

20 Claims, 9 Drawing Sheets

(56) References Cited

U.S. PATENT DOCUMENTS

| | | | |
|---|---|---|---|
| 11,782,097 B2* | 10/2023 | Rudloff | H02M 7/53871 |
| | | | 324/764.01 |
| 2007/0168582 A1 | 7/2007 | Huang et al. | |
| 2010/0263043 A1 | 10/2010 | Xu | |
| 2013/0111099 A1 | 5/2013 | Nie et al. | |
| 2016/0330191 A1 | 11/2016 | Watanabe | |
| 2018/0373658 A1 | 12/2018 | Shipp | |
| 2020/0081660 A1 | 3/2020 | Cohen et al. | |
| 2020/0349251 A1 | 11/2020 | Iyer et al. | |
| 2021/0109880 A1 | 4/2021 | Lu | |
| 2021/0264066 A1 | 8/2021 | Barzic et al. | |

OTHER PUBLICATIONS

Supplementary Partial European Search Report, European Patent Application No. 21907543.9, dated Jan. 25, 2024.

* cited by examiner

HARDWARE-BASED SECURITY AUTHENTICATION

This application is a continuation of U.S. patent application Ser. No. 17/962,627, filed Oct. 10, 2022, currently pending and scheduled to grant as U.S. Pat. No. 11,783,097 on Oct. 10, 2023, which is a continuation of U.S. patent application Ser. No. 17/122,234, filed Dec. 15, 2020 (now U.S. Pat. No. 11,468,202), each of which is hereby incorporated by reference herein in its entirety.

BACKGROUND

Many computing systems employ security to protect access to various resources such as memory and other types of peripheral devices within the system. For example, firewalls may be implemented to provide security. However, some types of resources, such as input/output (I/O) pins typically are not protected by way of firewalls.

SUMMARY

In at least one example, a system includes a multiplexer, an input/output (I/O) pin, a logic circuit, and a control register. The multiplexer has multiple inputs, an output, and a selection input. The logic circuit is coupled between the multiplexer and the I/O pin. The logic circuit has a first input. The control register includes first and second bit fields corresponding to the I/O pin. The first bit field is coupled to the selection input of the multiplexer, and the second bit field is coupled to the first input of the logic circuit.

In another example, a system includes an input/output (I/O) cell circuit and an I/O cell access control circuit coupled to the I/O cell circuit. The system further includes an authenticator coupled to a system bus, and a control register coupled between the authenticator and the I/O cell access control circuit. The authenticator is configured to authenticate a first request to map the I/O cell circuit to a device specified in the first request if the I/O cell circuit is not presently mapped to another device, and to update the control register to associate the device specified in the first request with the I/O cell circuit.

In yet another example, a method includes receiving a first request to access an input/output (I/O) pin. The I/O pin has a state. The first request specifies a device. The method further includes, responsive to the I/O pin's state indicating that the I/O pin is not assigned to any device, updating the state of the I/O pin in a control register to indicate that the I/O pin is associated with the device and storing an identifier of the device in the control register. Further, the method includes receiving a second request for connection of the I/O pin to the device, and, responsive to the control register storing an identifier of the device, updating the state of the I/O pin in the control register to specify a state contained in the second request.

BRIEF DESCRIPTION OF THE DRAWINGS

For a detailed description of various examples, reference will now be made to the accompanying drawings in which.

DETAILED DESCRIPTION

For a secure system, authorized software may be allowed to access granular resources such as I/O pins (data or control information), event/interrupt signals, etc. However, to build a traditional firewall system to manage which software can access a specific I/O pin may be area-intensive with substantial latency because the memory maps of the firewall are packed in continuous address ranges to control structures not associated with which software process could own them. The disclosed embodiments implement a security system for resources such as I/O pins that are not otherwise directly protected by firewalls. The disclosed embodiments include hardware circuits that provide secure access to I/O pins.

Figure 1:
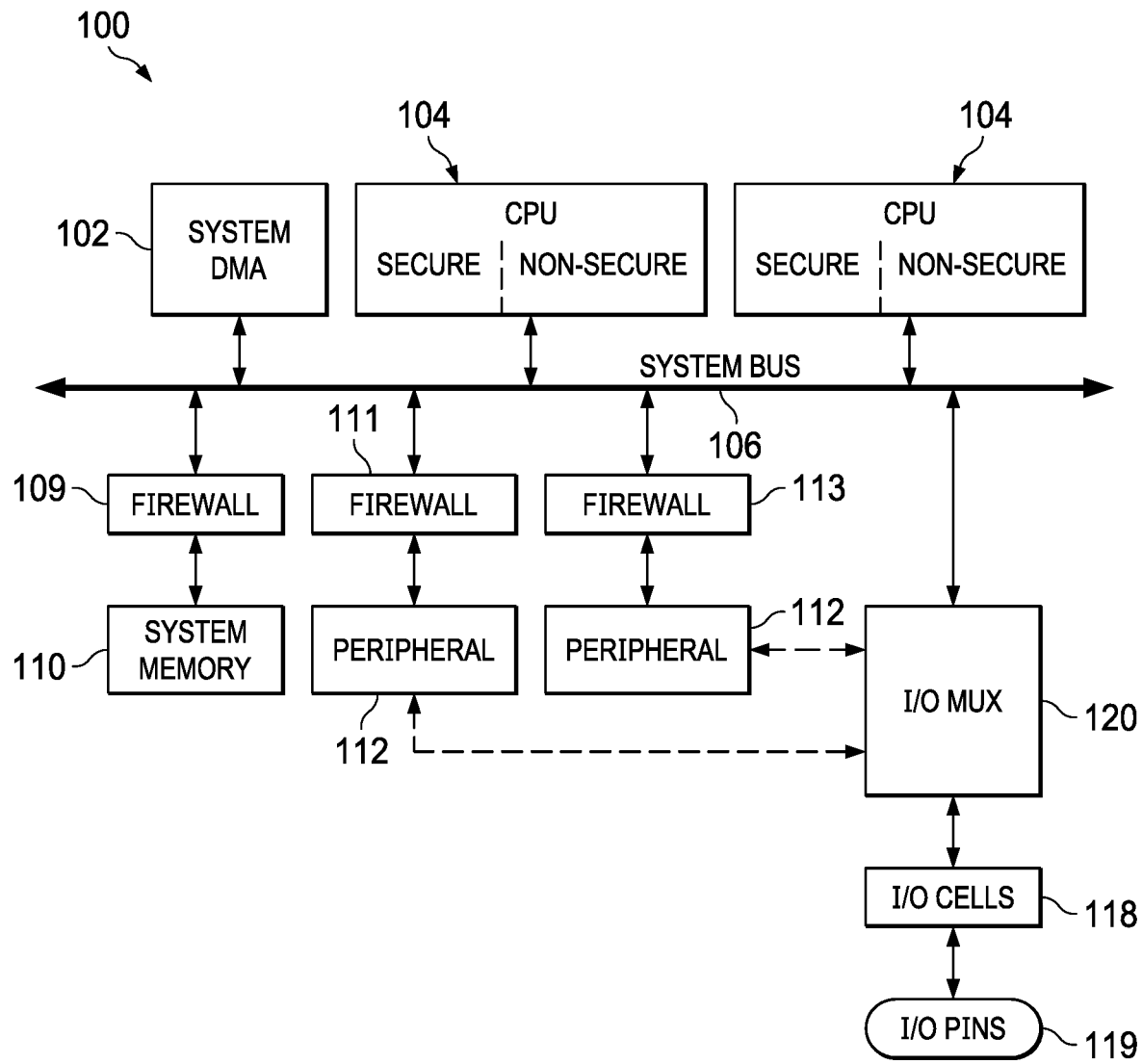
FIG. 1 illustrates a computing system employing destination-side firewalls and including an input/output (I/O) multiplexer to provide secure access to one or more I/O pins.

FIG. 1 shows an example of an electronic system 100 which includes a system direct memory access (DMA) controller 102, central processing units (CPUs) 104, system memory 110, peripheral devices 112, and I/O cells 118. The hardware components internal to each CPU 104 are partitioned into a secure portion and a non-secure portion, and each such portion has its own stack pointers and error handling hardware. Runtime code on a given CPU 104 generally does not have access to that CPU's secure portion. The system DMA controller 102 and CPUs 104 are coupled to a system bus 106. Each I/O cell 118 is a circuit that provides control of, and connection to, a corresponding I/O pin 119. The I/O pins 119 are accessible to devices external to computing system 100 as well as, as will be explained below, peripheral devices 112 within the electronic system 100. Each I/O cell 118 is a configurable circuit. For example, each I/O cell circuit 118 may have a glitch filter that can be enabled or disabled, a programmable slew rate, a programmable drive strength, a selectable pull-up or pull-down resistor, etc. In one implementation, computing system 100 is a system-on-chip (SoC) and I/O pins 119 are externally-accessible pins connected to pads on the semiconductor die of the SoC.

Two CPUs 104 are shown in the example of FIG. 1, but any number (one or more) of CPUs may be included. Similarly, two peripheral devices 112 are shown in FIG. 1, but any number of peripheral devices 112 can be included. At least one I/O pin is secured as described herein. Each peripheral device 112 provides one or more addressable peripheral device functions. A peripheral device function that is addressable permits software executed by a CPU 104 to issue bus transactions (reads and writes) on the system bus 106(?) targeting that particular function. For example, the system 100 may include two serial peripheral interface (SPI) controllers, each having one or more addressable peripheral device functions. Each SPI controller may provide, for example, an output clock and each such SPI clock is addressable. Further examples of a peripheral device include a universal asynchronous receiver/transmitter (UART) and an inter-integrated circuit (I2C) bus transceiver. The transmit data output (TXD) or receive data input (RXD) of a UART are addressable in one implementation as is the I2C clock of an I2C bus transceiver.

The term "peripheral device" in this disclosure refers to a device that can receive and respond to requests from, for example, a CPU 104 or the system DMA 102, but also can send data to or receive data from an I/O pin 119 via the I/O multiplexer 120 (described below). Accordingly, a peripheral device 112 may be an endpoint for a transaction from a CPU 104 or function as an intermediary between the CPU 104 and an endpoint (not shown) external to the electronic system 100 via an I/O pin 119.

For security reasons, the system memory 110 and each peripheral device 112 has an associated firewall. Firewall 109 protects the system memory 110 and firewalls 111 and 113 protect the corresponding peripheral device 112. The firewalls 109, 111, and 113 are coupled between the system bus 106 and the corresponding system memory 110 and peripheral devices 112. Each firewall 109, 111, and 113 is configured with any of variety of rules to control which transactions can be provided through the firewall to the destination device (e.g., system memory 110, peripheral device 112). FIG. 1 is an example of destination-side firewalls in that the firewalls directly protect the destination devices (e.g., the system memory 110 and peripheral devices 112).

Figure 2:
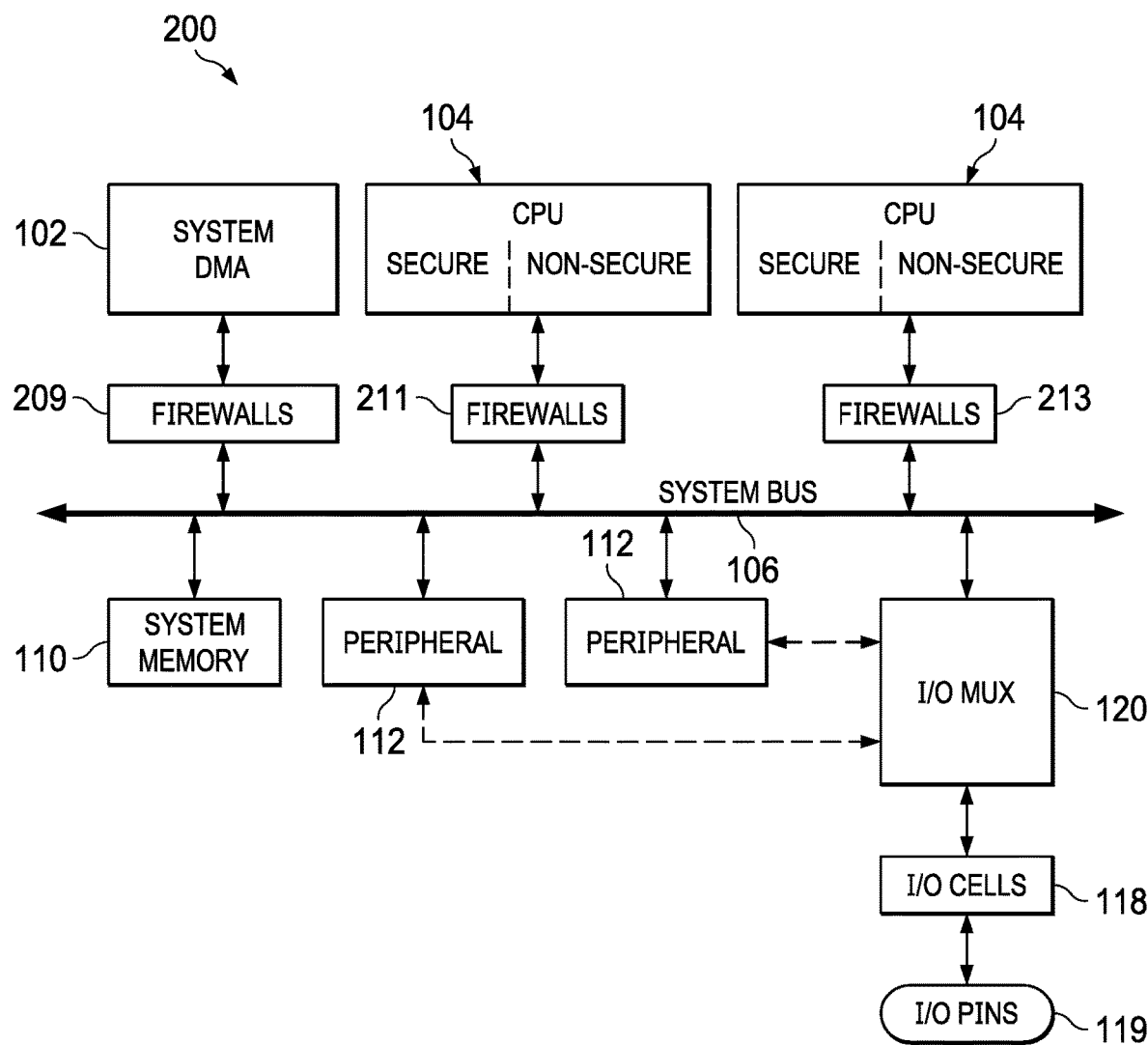
FIG. 2 illustrates another computing system employing source-side firewalls and including an I/O multiplexer to provide secure access to one or more I/O pins.

FIG. 2 shows an electronic system 200, similar to computing device 100 of FIG. 1, but with its firewalls implemented in a source-side firewall configuration. Electronic system 200 includes a firewall 209 coupled between the system DMA controller 102 and the system bus 106, and firewalls 211 and 213 coupled between the corresponding CPUs 104 and the system bus. Each firewall 209, 211, and 213 is configured to block any transactions from reaching the system bus 106 from its respective source device (system DMA 102, CPU 104) if such transaction fails to comply with the firewall rules implemented within the firewall.

Firewalls, however, are typically not implemented to protect access to I/O pins. In accordance with the disclosed examples and as illustrated in FIGS. 1 and 2, the electronic system 100 includes an I/O multiplexer 120 coupled between the I/O cells 118 and the peripheral devices 112 and system bus 106. As will be explained below, the I/O multiplexer 120 is a hardware circuit that can be used to implement security with respect to I/O cell access. For example, software executing on a CPU 104 can issue one or more transactions on the system bus 106 which collectively cause a particular peripheral device function to be connected to a particular I/O cell 118 and its I/O pin 119. After the peripheral device function is connected to the I/O pin, software may command the peripheral device function to control the logic state of the I/O pin. The I/O multiplexer 120 controls whether a given peripheral device function is able to access a given I/O cell 118 on behalf of a software request. For example, the I/O multiplexer 120 includes multiple control registers—one control register for each I/O cell 118. A control register can be programmed to include an identifier of a given peripheral function. Only the peripheral function identified in the control register can access the I/O cell 118 corresponding to the control register. Further, the I/O multiplexer 120 implements a security protocol as to how a given control register can be programmed with the identifier for a particular peripheral device in the first place.

The I/O multiplexer 120 sets the state of a given I/O cell 118 and controls access to the I/O cell by a peripheral device function based on the I/O cell's state. In one example, the states for an I/O cell 118 include UNASSIGNED, HANDOVER, CONNECTED (LOCKED), and CONNECTED (UNLOCKED). The UNASSIGNED state means that the I/O cell has not been assigned to any peripheral device function. The HANDOVER state means that the I/O cell has been assigned to a particular peripheral device function, but that the peripheral device function has not been connected to the I/O cell. The I/O multiplexer 120 implements two types of CONNECTED states. The CONNECTED (LOCKED) state means that a particular peripheral device function can now directly access the I/O pin but no other peripheral device can be connected to the I/O pin. The CONNECTED (UNLOCKED) state means that a particular peripheral device function can now directly access the I/O pin with the possibility that another peripheral device can be connected to the I/O pin. In another example, the I/O multiplexer implements a single CONNECTED state and thus without regard to any LOCK/UNLOCK control status.

For a given peripheral device function to control (write or read) a particular I/O pin 119, in one embodiment a multi-step security protocol is implemented by the I/O multiplexer 120. First, a CPU 104 executes one or more machine instructions (software) to issue a transaction on system bus 106 which will cause the peripheral device function to access a particular I/O pin 119. As explained above, each I/O pin 119 has a corresponding address. Each I/O pin also has an associated, programmable control register The I/O multiplexer 120 stores a list of the addresses of the I/O pins that are currently in the UNASSIGNED state, that is, I/O pins that are available to be connected to a peripheral device function. In one example, the system bus transaction for a peripheral device function to use a pin in the UNASSIGNED state is a first write transaction in which the write address is the address of the pin and the write data includes the address of the peripheral device function attempting to gain access to the pin. The I/O multiplexer 120 stores the state of the I/O pin, for example, in the control register associated with the I/O pin. Upon receipt of the bus transaction (e.g., the first write transaction mentioned above), the I/O multiplexer verifies that the state of the target pin is currently UNASSIGNED and, if that is the case, then the I/O multiplexer changes the state of the I/O pin in the associated control register from UNASSIGNED to HANDOVER. The I/O multiplexer stores an identifier of the state in the register and thus changes the identifier from an identifier indicative of UNASSIGNED to an identifier indicative of HANDOVER. The I/O multiplexer also stores an identifier of the particular peripheral device function identified by the aforementioned bus transaction. At this point, the control register for the target I/O pin indicates that a particular peripheral device function is associated with the I/O pin and the pin is in the HANDOVER state. Upon receipt of the aforementioned first write transaction, if the state of the I/O pin is not in the HANDOVER state (which may be the case if the I/O pin is in the CONNECTED state with respect to a different peripheral device function), then in one example the I/O multiplexer will not update the pin's control register to store the identifier of the peripheral device function identified in the first write transaction—and thus prevent the peripheral device function being able to use the I/O pin.

The second step of the security protocol is for a CPU 104 to execute one or more machine instructions to issue a second write transaction to the peripheral device function with the write data including certain bits which specify that the I/O pin is to transition to the CONNECTED state (CONNECTED LOCKED or CONNECTED LOCKED) for the peripheral device function. The I/O multiplexer receives this latter, second write transaction and compares the peripheral function identifier from the I/O pin's control register to the identifier of the peripheral device function targeted by the second write transaction. If the I/O multiplexer determines that the identifiers match, then the I/O multiplexer updates the state stored in the I/O pin's control register from the HANDOVER to the CONNECTED state (LOCKED or UNLOCKED). If the I/O multiplexer determines that the identifiers do not match, then, then update to the control register does not occur and the peripheral device function targeted by the second write transaction is not permitted to be connected to the I/O pin.

The third step of the security protocol is for software running on the CPU 104(?) to issue a third write targeting the peripheral device function with the write data being the data that is to be transmitted through the connected I/O pin. The bits of the I/O pin's control register that store the identifier of the peripheral device CONNECTED to the I/O pin are used to select the particular input of a multiplexer corresponding to the peripheral device to which the I/O pin is CONNECTED. If the I/O pin is not in the CONNECTED state (e.g., the pin is in the UNASSIGNED or HANDOVER states), then none of the multiplexer's inputs is selected. The output of the multiplexer passes through a logic circuit which permits the multiplexer's selected input to pass through if the state of the I/O pin is in the CONNECTED state. If the pin is not in the CONNECTED state, then even if an input of the multiplexer is selected to be its output, the signal on the multiplexer's output is precluded from reaching the I/O pin.

Figure 3:
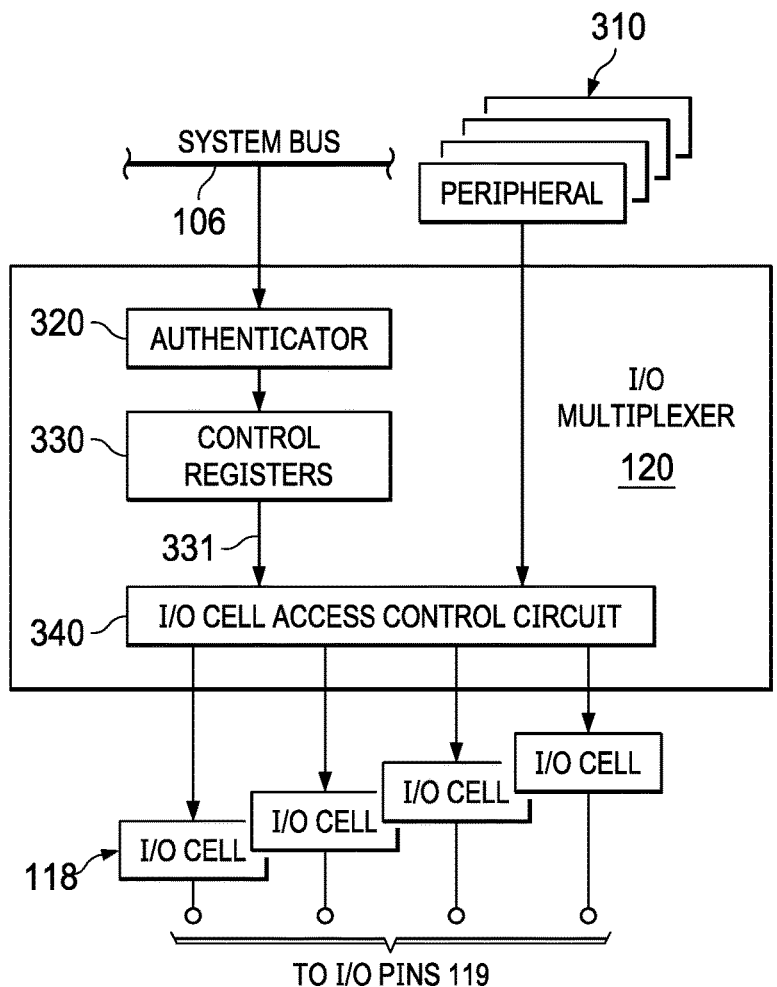
FIG. 3 is an example block diagram of the I/O multiplexer of FIGS. 1 and 2.
Figure 5:
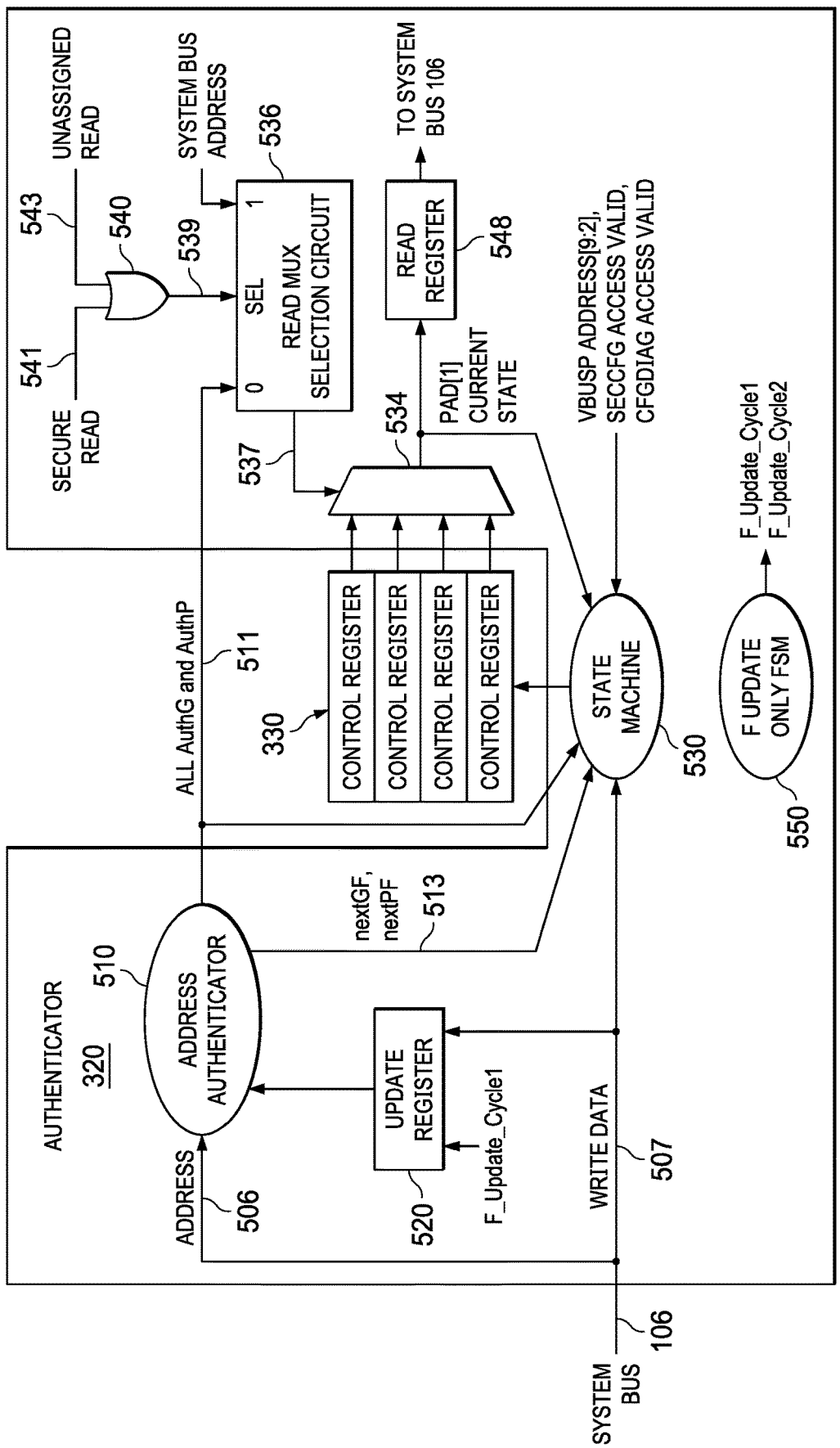
FIG. 5 illustrates an example of an authenticator included within the I/O multiplexer of FIG. 3.
Figure 6:
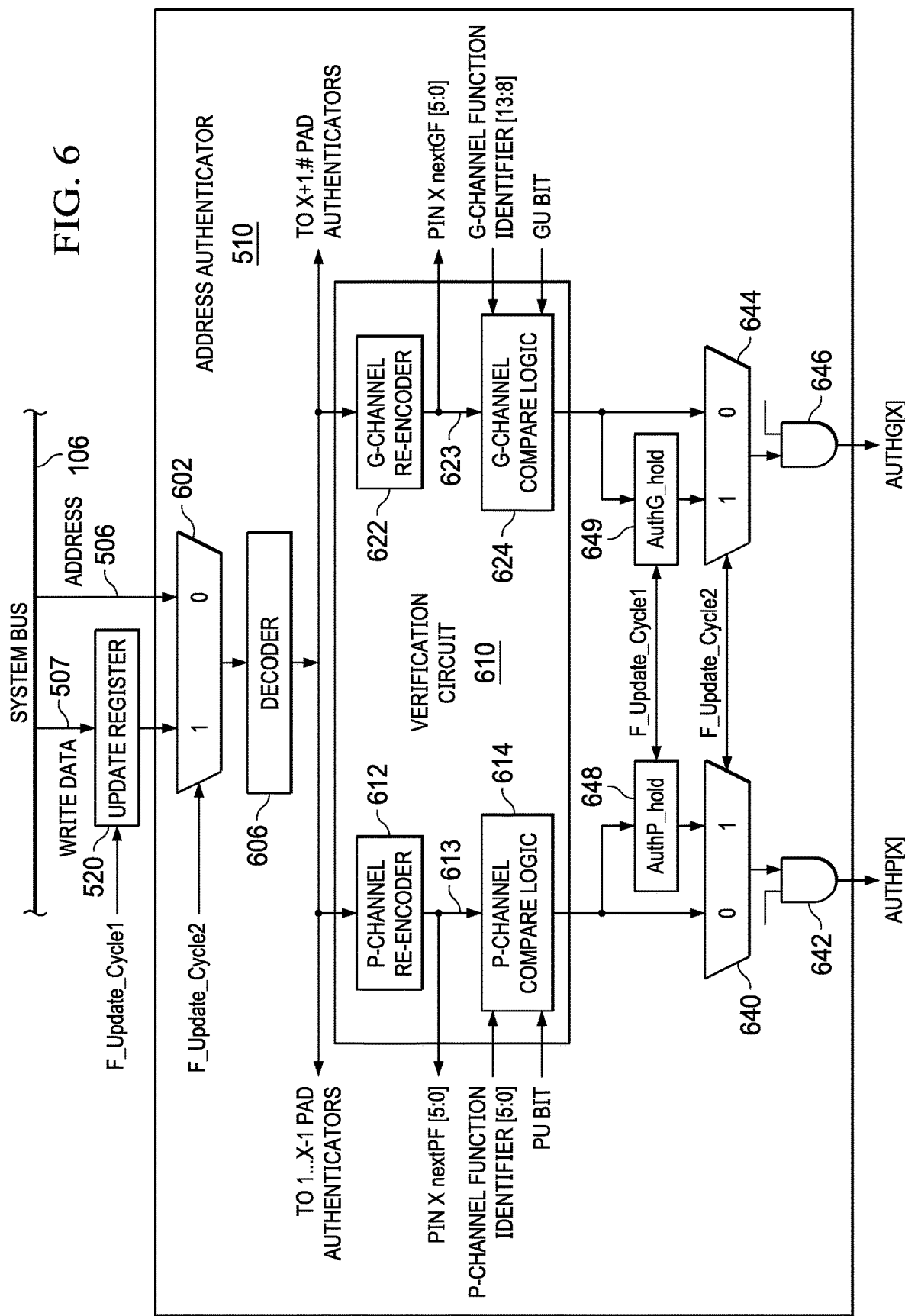
FIG. 6 illustrates an example of an address authenticator included with the authenticator of FIG. 5.

FIG. 3 is a block diagram of the I/O multiplexer 120 and its connections to the system bus 106, peripheral devices 310 (which may be, for example, the system memory 110 and peripheral devices 112 of FIGS. 1 and 2), and I/O cells 118. The I/O multiplexer 120 includes an authenticator 320, control register 330, and an I/O cell access control circuit 340. Additional or different components may be included as well as part of the I/O multiplexer 120. Each peripheral device 310 implements at least one addressable peripheral device function. FIGS. 5 and 6 provide a detailed example implementation of the authenticator 320 and will be described below. Similarly, FIG. 7 (described below) provides a detailed example implementation of the I/O cell access control circuit 340.

Referring still to FIG. 3, each I/O pin 119 is connected to a corresponding I/O cell 118. Control registers 330 include a control register for each I/O cell 118 (which thus also means each I/O pin 119 has a corresponding control register). In general, the authenticator 320 receives and authenticates transactions on system bus 106 from software executed by a CPU 104. The particular transactions to be authenticated by the authenticator 320 include one or more of the write transactions noted above in the multi-step security protocol connecting an I/O pin to a particular peripheral device function. The authenticator 320 includes storage for addresses of I/O pins that are in the UNASSIGNED state—I/O pins which are thus available to be connected to a peripheral device function. For a write transaction whose write address is the address of an I/O pin and whose write data is the address of a peripheral device function, the authenticator 320 determines whether the write address corresponds to an I/O pin in the UNASSIGNED state. If the write address corresponds to an I/O pin in the UNASSIGNED state, the authenticator 320 updates the I/O pin's register with an identifier of the peripheral device function—otherwise (if the current state of the I/O pin is other than UNASSIGNED) the authenticator 320 does not update the register with the identifier of the peripheral device function.

In one example implementation, the authenticator 320 converts the peripheral device function's address to a shorter (i.e., fewer bits) identifier. For example, the addresses implemented by software are 27 bits long. To avoid implementing I/O pin control registers large enough to store 27-bit addresses, the authenticator 320 converts the 27-bit addresses to, for example, 6-bit identifiers for storage in the control registers. With 6-bit identifiers, 31 different peripheral device functions (identifier 000000 not being an identifier of a valid peripheral device function) can access a given I/O pin. Fewer or more than 6 bits can be used to implement peripheral device functions. In other implementations, however, the control registers 330 are large enough to store the full addresses of the peripheral device functions.

The control register for an I/O pin also has one or more bits for storing the state of the I/O pin. In addition to the authenticator 320 storing the identifier of the peripheral device function, the authenticator 320 also changes the state bits in the control register to specify the HANDOVER state.

Once in the HANDOVER state, CPU 104 can issue another write transaction to cause the state of the I/O pin to transition from the HANDOVER state to a CONNECTED state (either CONNECTED LOCK or CONNECTED UNLOCK). For this write transaction, the write address is the address of the peripheral device whose identifier is stored in the control register for the I/O pin. The authenticator 320 receives the write transaction, converts the write address to the corresponding 6-bit identifier and compares the converted identifier to the identifier already stored in the I/O pin's control register. If the two identifiers do not match, then the authenticator does not change the state of the I/O pin from the HANDOVER state to a CONNECTED state and the peripheral device function corresponding to the identifier converted from the write address in the write transaction is not permitted to connect to the I/O pin. However, if the authenticator 320 determines that the two identifiers match, then the authenticator updates the status stored in the I/O pin's control register from HANDOVER to one of the CONNECTED states. The particular type of CONNECTED state is determined from the write data in the write transaction.

With the control register for the I/O pin specifying that the I/O pin is in the CONNECTED state, one or more control signals 331 are asserted to the I/O cell access control circuit 340 to configure the I/O cell access control circuit 340 to select a signal from the addressable peripheral device function that corresponds to the peripheral device identifier stored in the I/O pin's control register and to permit that signal to be routed through to the I/O pin.

In some implementations, for each I/O pin 119, the I/O multiplexer 120 implements multiple channels though which peripheral devices can be connected to any given I/O pin. For example, the I/O multiplexer 120 may implement two channels referred to herein as the P channel and the G channel. Multiple peripheral device functions can be connected to inputs of the P channel and multiple peripheral device functions can be connected to inputs of the G channel. A given peripheral device function can be connected to one channel, but not the other channel. Alternatively, the same peripheral device function can be connected to inputs of both channels.

Figure 4:
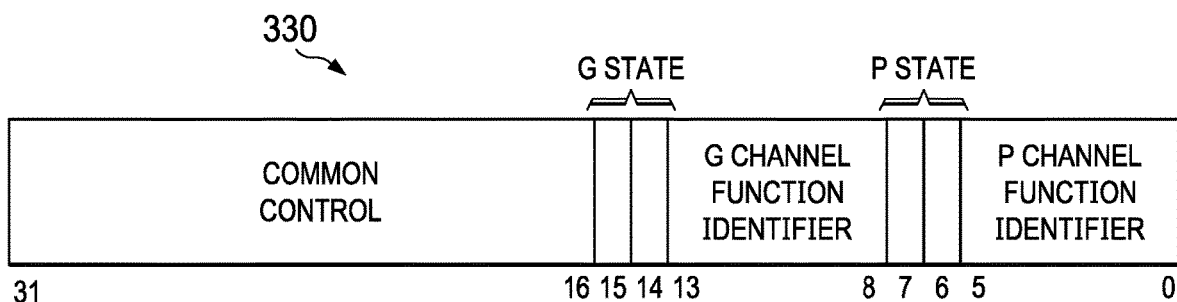
FIG. 4 illustrates the content of the control register associated with each I/O pin.

FIG. 4 shows an example bit assignment for a control register 330 of a given I/O pin. The bit assignment of the control registers of all of the I/O pins may be as shown in FIG. 4. In the example of FIG. 4, the control register 330 is a 32-bit register. Bits [5:0] store the identifier of the peripheral device function selected through the P channel. Bits [7:6] store the state of the I/O pin with respect to the P channel and this is referred to as the P state. In one implementation, the P-channel state bit assignments are:

TABLE I

Bit Assignment for P Channel State

| Bit 7 | Bit 6 | State of P Channel |
|---|---|---|
| 0 | 0 | UNASSIGNED |
| 0 | 1 | HANDOVER |
| 1 | 0 | CONNECTED (UNLOCKED) |
| 1 | 1 | CONNECTED (LOCKED) |

Similarly, for the G channel, bits [13:8] store the identifier of the peripheral device function selected through the G channel and bits [15:14] store the state of the I/O pin with respect to the G channel (the G state) as is shown in Table II.

TABLE II

Bit Assignment for G Channel State

| Bit 15 | Bit 14 | State of G Channel |
|---|---|---|
| 0 | 0 | UNASSIGNED |
| 0 | 1 | HANDOVER |
| 1 | 0 | CONNECTED (UNLOCKED) |
| 1 | 1 | CONNECTED (LOCKED) |

When the P channel is in either of the CONNECTED states, bit 7 is 1. Similarly, when the G channel is in either of the CONNECTED states, bit 15 is 1. Thus, bits 7 and 15 of an I/O pin's control register 330 can be used as part of control signals 331 to the I/O cell access control circuit 340 to cause the I/O cell access control circuit to provide a communication pathway from a peripheral device function to the I/O pin's I/O cell 118. The use of bits 7 and 15 is further illustrated in FIG. 7 and discussed below.

Bits [31:16] of the controller register 330 provide the common control bits for the I/O pin. The common controls control the configuration of the I/O pin regardless of which channel's (P or G) peripheral device function is connected to and using the I/O pin. Table III below provides an example bit assignment for the common control bits of the control register.

TABLE III

COMMON CONTROL BIT ASSIGMENTS

| Bit | Name | Type | Description |
|---|---|---|---|
| 31 | reserved | R | Reserved |
| 30 | GFLT | RW | Glitch Filter Enable<br>0: No internal glitch filter<br>1: Use internal glitch filter |
| 29 | SLEW | RW | Slew Rate Control<br>0: No slew rate control<br>1: Use slew rate control |
| 28 | WCOMP | RW | Wake Up Compare Value<br>0: Match '0' will wake<br>1: Match '1' will wake |
| 27 | WUEN | RW | Wake Up Enable<br>0: Wake up not enabled<br>1: Wake up enabled |
| 26 | INV | RW | Invert digital input/output relative to peripheral device function signal<br>0: Input and output are not inverted<br>1: Input and output are inverted |
| 25 | Z1 | RW | High-Z (impedance) instead of high output<br>0: Pin can be driven high<br>1: Pin is tri-stated instead of driven high |
| 24 | Z0 | RW | High-Z (impedance) instead of low output<br>0: Pin can be driven low<br>1: Pin is tri-stated instead of driven low |
| 23 | reserved | R | Reserved |
| 22:20 | DRV | RW | Drive Strength Options |
| 19 | HYSTEN | RW | Hysteresis Enable<br>0: No hysteresis<br>1: Hysteresis on |
| 18 | INENA | RW | Input Enable<br>0: Inputs to core are driven as 1'b0<br>1: inputs to core connected to I/O pin |
| 17 | PIPU | RW | Pull Up Enable<br>0: No pull up<br>1: Pull up enabled |
| 16 | PIPD | RW | Pull Down Enable<br>0: No pull down<br>1: Pull down enabled |

FIG. 5 is an example implementation of the authenticator 320 of the I/O multiplexer 120 (FIG. 3). As shown, the authenticator 320 includes an address authenticator 510, state machines 530 and 550, register 520, read register 548, multiplexer 534, a read multiplexer selection circuit 536, and OR gate 540. Some or all of the address portion (address 506) of the system bus 106 is coupled to the address authenticator 510. Some or all of the data portion 507 of the system bus 106 is coupled to state machine 530. The state machines 530 and 550 may be implemented as digital logic circuits that perform the functionality described herein for the multi-step security protocol. Based on the write transactions described herein and based on the current state of the target I/O pin, the state machine 530 updates the corresponding I/O pin control register 330.

As explained above, for an I/O pin in the UNASSIGNED state, a write transaction with a write address that matches the address of the I/O pin causes the state machine 530 to update the corresponding control register 330 to store the identifier of the peripheral device function whose address is in the write data portion of the write transaction. This process occurs in two steps. In the first step, the write data is loaded into register 520 (also referred to as the update register) under control of the F_Update_Cycle1 control signal. The F_Update_Cycle1 control signal is generated by state machine 550. State machine 550 also generates an F_Update_Cycle2 control signal whose usage is shown in FIG. 6. In the example implementation, in order to use the same authentication address decode logic, the data portion of the transaction is captured in Cycle1 (through assertion of F_Update_Cycle1) and then processed through the address decoder in Cycle2 (through assertion of F_Update_Cycle2). By contrast, a transaction that was directed at reading/writing the control register would have the address to be decoded as the address portion of the transaction and the decode operation would occur in cycle 1. As such, the contents of update register 520 includes the identifier corresponding to the address of the peripheral device function.

As will be explained below with regard to FIG. 6, the address authenticator 510 determines whether the transaction is allowed to modify control information for the P and G channels. The address authenticator 510 asserts an authentication signal for the P channel (AUTHP) responsive to the identifier from the update register 520 matching the identifier currently stored in bits [5:0] of the control register for the I/O pin and an authentication signal for the G channel (AUTHG) responsive to the identifier from the update register 520 matching the identifier currently stored in bits [13:8] of the control register.

To update a control register 330, a write transaction must be authenticated as described herein. To read a control register 330, if the corresponding I/O pin is UNASSIGNED, then no particular authentication is required to permit the read to occur. If the I/O pin is in the HANDOVER or a CONNECTED state, then only two entities can read the I/O pin. The peripheral device function that is mapped to the I/O pin in the HANDOVER or CONNECTED state can read that I/O pin's control register 330 or a high-level secure process can read the I/O pin. Read multiplexer selection circuit 536 generates a selection signal 537 to multiplexer 534 to select which control register's output read data is permitted to be stored in the read register 548. The read register 548 is coupled to the system bus 106 and thus the control register content in the read register 548 can be provided therefrom to the entity that initiated the read transaction.

The SECURE READ signal 541 is asserted (e.g., logic 1) by, for example, a CPU 104 upon a secure process issuing a read transaction. Otherwise, SECURE READ is in the opposite logic state (e.g., 0). Similarly, the UNASSIGNED READ signal 543 is asserted (e.g., logic 1) by, for example, a CPU 104 upon any process or peripheral device function attempting to read a control register whose I/O pin is in the UNASSIGNED state. Otherwise, UNASSIGNED READ is in the opposite logic state (e.g., 0). Read multiplexer selection circuit 536 has a 0-input and 1-input. The 0-input is coupled to the address authenticator 510 and if the output signal 539 of OR gate 540 is a logic 0 (which is the case if neither a read from a secure process nor a read to an UNASSIGNED I/O pin has occurred). In that case, a peripheral device function that has been authenticated by address authenticator 510 is permitted to read the appropriate control register 330 in that the selection signal 537 from the read multiplexer selection circuit 536 selects the corresponding control register 330 to transfer its contents to the read register 548.

The 1-input of the read multiplexer selection circuit 536 is coupled to at least a portion of the address portion of the system bus 106. Upon either the SECURE READ or UNASSIGNED READ signals 541, 543 being asserted to a logic 1 state, the OR gate 540 generates a logic 1 on its output signal 539 to thereby cause the read multiplexer selection circuit 536 to select its 1-input and thus cause the address portion of the system bus 106 to be used to select the particular control register 330 to have its contents transferred to the read register 548. The address portion of the system bus 106 may be mapped to a smaller (i.e., fewer bits) representation to be used as a selection signal 537 to multiplexer 534.

FIG. 6 shows an example implementation of the address authenticator 510. The address authenticator 510 includes an input multiplexer 602, a decoder 606, and a verification circuit 610. The address authenticator 510 includes a separate verification circuit 610 for each I/O pin to be protected as described herein. The "0" input to multiplexer 602 receives the address portion 506 from the system bus 106 and the "1" input receives the write data portion 507 from the system bus 106. The state machine 550 asserts F_Update_Cycle1 (e.g., to logic 1) to load the write data 507 into the update register 520. After the write data is loaded into the update register 520, the state machine 550 then asserts F_Update_Cycle2 to cause the "1" input of multiplexer 602 to be selected through as its output to decoder 606. Otherwise (when F_Update_Cycle2 is asserted to its opposite polarity state (e.g., logic 0)), the address portion 506 of the system bus is selected through multiplexer 602 as its output to decoder 606.

The decoder 606 is shared by all of the I/O multiplexers 120. The decoder 606 converts the address provided to it from multiplexer 602 (be it the address directly from the system bus 106 or the address retrieved from the write data of a write transaction via the update register 520) to a shorter peripheral device function identifier (e.g., 6 bits in length).

The verification circuit 610 for each I/O pin includes, for its P-channel, a P-channel re-encoder 612 coupled to a P-channel compare logic circuit 614. Similarly, the verification circuit 610 includes, for its G-channel, a G-channel re-encoder 622 coupled to a G-channel compare logic circuit 624. Each re-encoder 612 and 622 converts the longer address from the system bus 106 to a shorter representation for the peripheral device function identifiers. The output 613 of the P-channel re-encoder 612 is the peripheral device function identifier (labeled Pin X Next PF [5:0] in FIG. 6)

decoded from the system bus 106 or from the update register 520. Similarly, output 623 of the G-channel re-encoder 622 is the peripheral device function identifier (labeled Pin X Next GF [5:0]) decoded from the system bus 106 or from the update register 520.

FIG. 6 shows an input to the P-channel compare logic 614 being a P-channel unassigned (PU) bit and an input to the G-channel compare logic 624 being a G-channel unassigned (GU) bit. PU is asserted to logic state (e.g., logic 1) responsive to the I/O pin being in the UNASSIGNED state with respect to the P-channel. Similarly, GU is asserted to logic state (e.g., logic 1) responsive to the I/O pin being in the UNASSIGNED state with respect to the G-channel. If PU is asserted to logic 0, the P-channel compare logic circuit 614 compares Pin X Next PF [5:0] with the P-channel function identifier currently stored in that I/O pin's control register. That is, the comparison is performed by the P-channel compare logic when the I/O pin is not in the UNASSIGNED state for the P-channel—if the P-channel is in the UNASSIGNED state, the control register for that channel will not have a valid peripheral device function with which to be compared. Similarly, If GU is asserted to logic 0, the G-channel compare logic circuit 624 compares Pin X Next GF [5:0] with the G-channel function identifier currently stored in that I/O pin's control register. That is, the comparison is performed by the G-channel compare logic when the I/O pin for the G-channel is not in the UNASSIGNED state. The output of the P-channel compare logic circuit 614 is a bit having one logic state (e.g., 1) if its peripheral device function identifiers match; otherwise the output bit is the other logic state (e.g., 0). The output of the G-channel compare logic circuit 624 is a bit having one logic state (e.g., 1) if its peripheral device function identifiers match; otherwise the output bit is the other logic state (e.g., 0).

The address authenticator 510 also includes multiplexers 640 and 644, AND gates 642 and 646 (other types of logic gates), and AUTHP_HOLD and AUTHG_HOLD registers 648 and 649. The AUTHP_HOLD and AUTHG_HOLD registers 648 and 649 are used to store the corresponding output bits of the P-channel compare logic circuit 614 and the G-channel compare logic circuit 624. Assertion of the F_Update_Cycle1 causes registers 648 and 649 to store the corresponding outputs of the P-channel and G-channel compare logic circuits 6124, 624. Responsive to F_Update_Cycle2 being a logic 0, multiplexers 640 and 644 are configured to select their 0-inputs (which are the outputs of the corresponding P-channel and G-channel compare logic circuits 614, 624 as their outputs. Otherwise, responsive to F_Update_Cycle2 being a logic 1, the 1-inputs of multiplexers 640, 644 are selected as their outputs. This functionality causes AUTHP[X] and AUTHG[X] for I/O pin X to be asserted at the correct time, that is, at the time either (a) coincident with the authentication of the address stored in the update register 520 (in the case of a write to the I/O pin address with the write data being the address of the peripheral device function) or (b) coincident with the authentication of the address directly from the address portion 506 of the system bus (in the case in which write transaction is to the address of the peripheral device function. An asserted AUTHP[X] (e.g., logic '1') means that the transaction on the P channel has been authenticated and can proceed (e.g., to update a control register 330). AUTHP[X] being a 0 means that the transaction is not authenticated. Similarly, an asserted AUTHG[X] (e.g., logic '1') means that the transaction on the G channel has been authenticated and can proceed.

Figure 7:
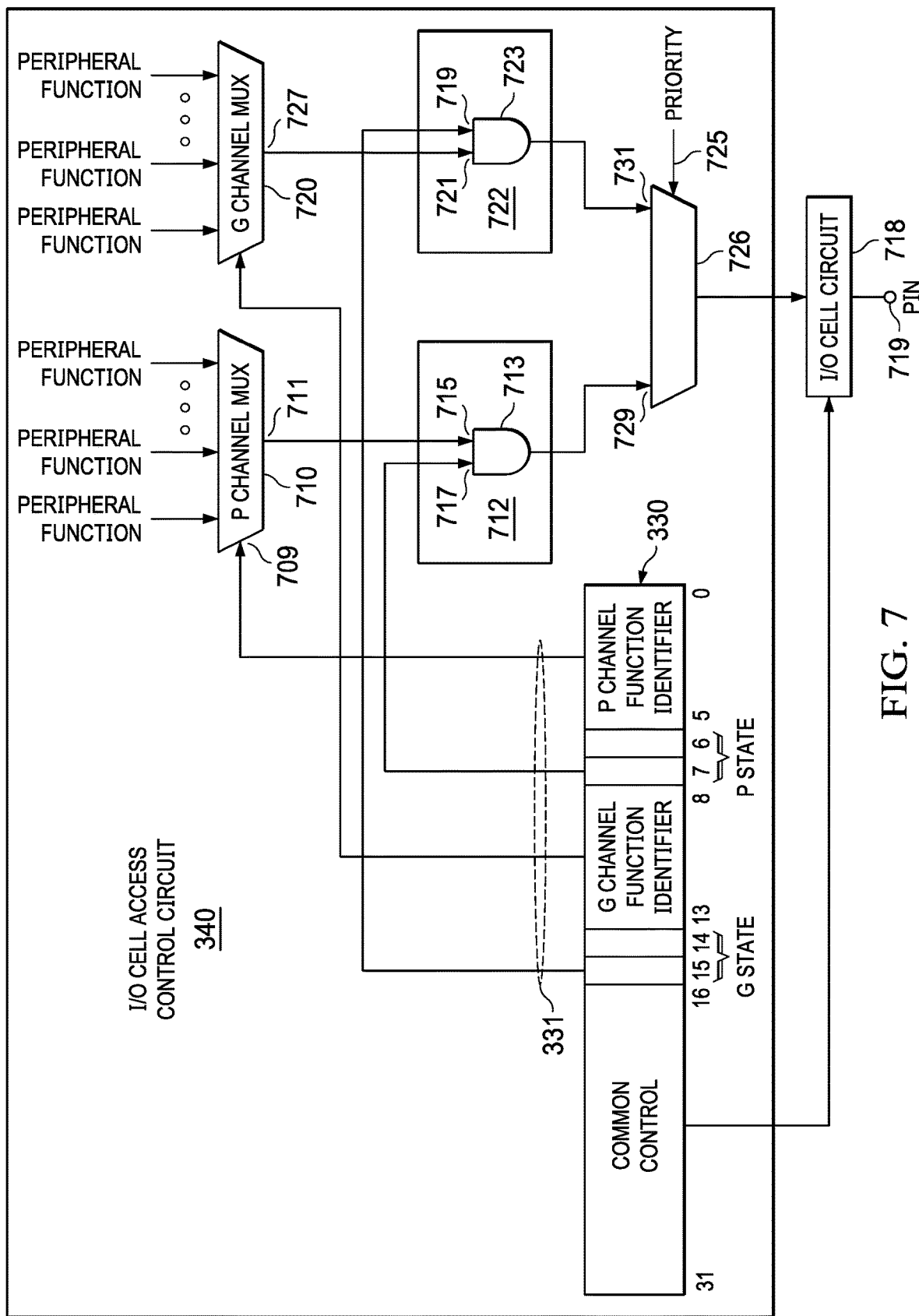
FIG. 7 illustrates an example of an I/O cell access control circuit included within the I/O multiplexer of FIG. 3.

FIG. 7 shows an example implementation of the I/O cell access control circuit 340. A separate I/O access control circuit 340 is provided for each I/O cell and corresponding I/O pin. FIG. 7 shows the I/O access control circuit 340 for an I/O pin 719 (which may be one of the I/O pins 119 in FIGS. 1-3). I/O pin 719 is coupled to an I/O cell circuit 718 which in turn is connected to the I/O cell access control circuit 340.

The I/O access control circuit 340 includes a P channel multiplexer 710, a P-channel logic circuit 712, a G channel multiplexer 720, a G channel logic circuit 722, multiplexer 726, and outbound manipulation circuit 728. The P channel multiplexer 710 has multiple inputs, any of which can be coupled to a peripheral device function, an output and a selection input. In one implementation, the P channel multiplexer has 32 inputs and thus can be coupled to as many as 31 different peripheral device functions. The P channel peripheral function identifier (bits [5:0]) is the selection signal for the P-channel multiplexer. However, identifier value 000000 is not a valid peripheral device function so a maximum of only 31 peripheral device functions can be selected by the peripheral device function in the control register. Each peripheral device function input to multiplexer 710 is a single bit signal (i.e., a 0 or a 1 from the corresponding peripheral device function). Responsive to the state machine 530 programming the I/O pin control register with a particular peripheral device identifier for the P channel, the programmed peripheral device identifier (which is coupled to the selection input 709 of the P channel multiplexer 710 causes the P channel multiplexer to select the input corresponding to the peripheral device identifier stored in the control register.

The P channel logic circuit 712 prevents the selected input of the P channel multiplexer 710 from being in communication with the I/O cell 718 unless the P channel is in the CONNECTED state. The P channel logic circuit 712 has inputs 715 and 717. The output 711 of the P-channel multiplexer 710 is coupled to input 715 of the P channel logic circuit 712. In the example of FIG. 7, the P channel logic circuit 712 is, or includes, an AND gate 713 and inputs 715 and 717 are the inputs of the AND gate 713. Bit 7 of the P state field of the control register 330 is coupled to input 717 of AND gate 713. In one implementation, each control register 330 is a combination of flip-flops and bit 7 is the output of a flip-flop. As explained previously, bit 7 is a 1 when the P channel is in either of the CONNECTED states. With bit 7 being a 0, any signal from a peripheral device function through multiplexer 710 will be gated off by AND gate 713. Responsive to the P channel being in a CONNECTED state, bit 7 is a 1 and thus the logic state of a signal on the selected peripheral device function through multiplexer 710 flows through AND gate 713 to input 729 of multiplexer 726.

The G channel has a configuration similar to that of the P channel. The G channel multiplexer 720 has multiple inputs (e.g., 32), any of which can be coupled to a peripheral device function. The G channel peripheral function identifier (bits [13:8]) is the selection signal for the G channel multiplexer 720. Thus, responsive to the state machine 530 programming the I/O pin control register with a particular peripheral device identifier for the G channel, the programmed peripheral device identifier causes the G channel multiplexer 720 to select the input corresponding to the peripheral device identifier stored in the control register. Each peripheral device function input to multiplexer 720 is a single bit signal (i.e., a 0 or a 1 from the corresponding peripheral device function). The G channel logic circuit 722 has inputs 719 and 721. The output 727 of the G channel multiplexer 720 is coupled to input 721 of the G channel logic circuit 722.

As is the case for the P channel's logic circuit 712, the G channel's logic circuit 722 prevents the selected peripheral device function from communicating with the I/O cell unless the G channel is in the connected state. In the example of FIG. 7, the G channel logic circuit 722 is, or includes, an AND gate 723 and inputs 719 and 721 are the inputs of the AND gate 723. Bit 15 (which may be the output of a flip-flop) of the G state field of the control register 330 is coupled to input 719 of AND gate 723. As explained previously, bit is a 1 when the G channel is in either of the CONNECTED states. With bit 15 being a any signal from a peripheral device function through multiplexer 720 will be gated off by AND gate 723. Responsive to the GP channel being in a CONNECTED state, bit 15 is a 1 and thus the logic state of a signal on the selected peripheral device function through multiplexer 720 flows through AND gate 723 to input 731 of multiplexer 726.

As such, for a given peripheral device function to assert a signal through to a given I/O cell 718, the control register for that I/O cell must be programmed for the identifier of the given peripheral device function and the channel to which that peripheral device function is coupled must be in one of the CONNECTED states. The bits of the peripheral device function identifier in the control register are used to control that channel's multiplexer 710, 720 and at least one of the state bits for that channel (e.g., bits 7 and 15) are used to gate on/off the communication pathway between the peripheral device function and the I/O cell based on the state of the channel.

Multiplexer 726 implements a priority selection between the P and G channels in the event both channels have an active connection between the I/O cell circuit 718 and peripheral device functions. For example, the G channel could be used to drive a wake-up protocol sequence of bits to the I/O pin 719 to signal a receiving device that a transmission is about to occur, while the P channel could be used to drive data to the receiving device. The PRIORITY signal 725 is a selection signal for multiplexer 726 to select one of the P or G channels to be coupled to the I/O cell circuit 718. The PRIORITY signal 725 may be asserted by, for example, state machine 530.

The I/O cell circuit 718 receives one or more bits of the common control field within the control register 330 The I/O cell circuit 718 uses the bits to configure the I/O cell circuit 718 (e.g., open drain, pull-up or pull-down resistor, drive strength, etc.).

Figure 8:
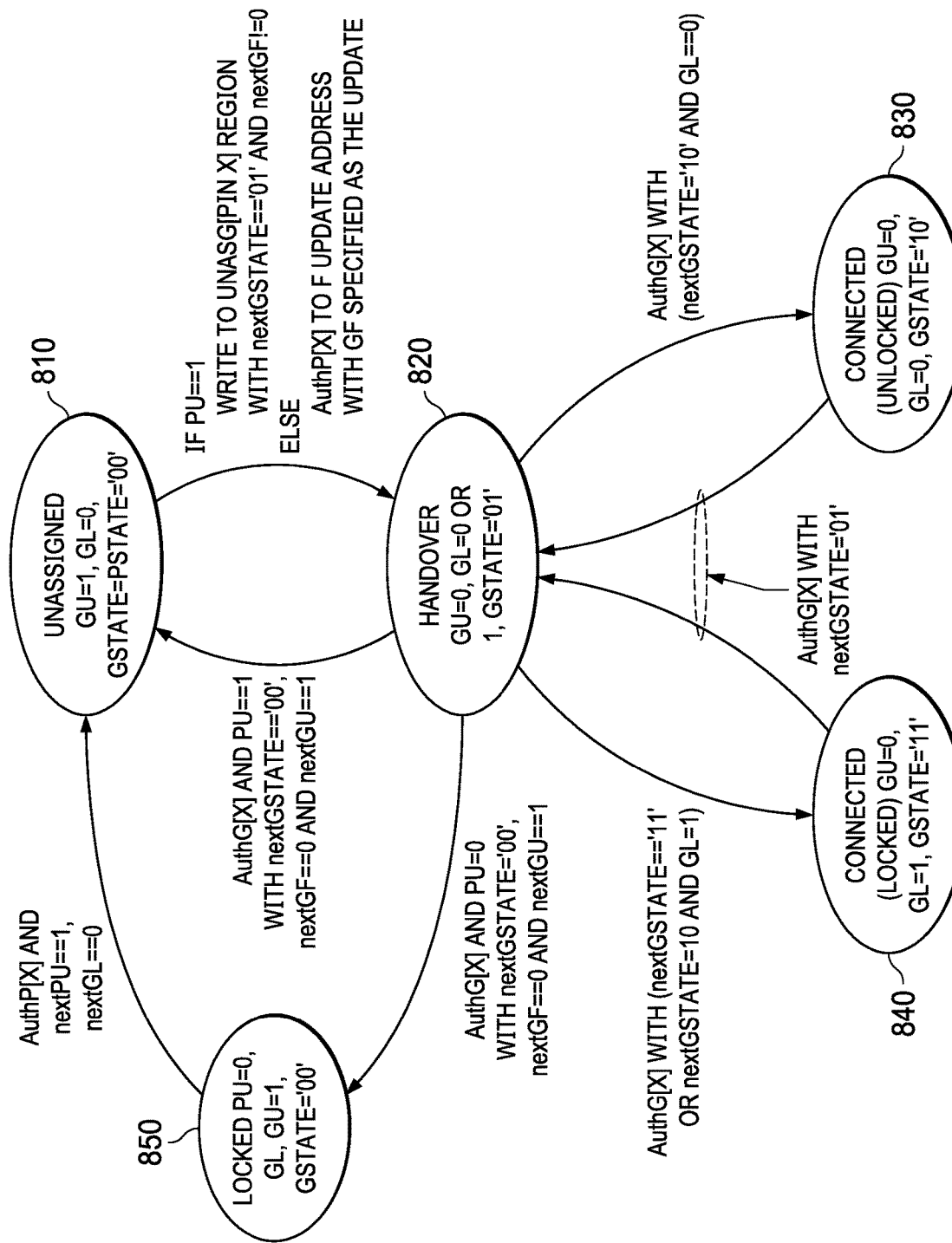
FIG. 8 shows an example state diagram implemented by a state machine within the authenticator of FIG. 5.

FIG. 8 is an example state diagram illustrating the states implemented by state machine 530 for a given I/O pin X. This state diagram is applicable to either the G channel or the P channel for a given I/O pin. The states in this example shown include UNASSIGNED 810, HANDOVER 820, CONNECTED (UNLOCKED) 830, CONNECTED (LOCKED) 840, and LOCKED 850. GU is a hidden register bit for the G channel indicating the unassigned state of the G channel. GU being a 1 means that the G channel is unassigned for I/O pin X while GU being a 0 means that a peripheral device function has been assigned through the G channel for I/O pin X. PU also is a hidden register bit that means the same as the GU bit but for the P channel. GL is a hidden register bit for the G channel indicating the lock status of the G channel. GL being a 1 means that I/O pin X is in the locked state for a particular peripheral device function while GL being a 0 means that the I/O pin is not in the locked state. PL also is a hidden register bit that means the same as the GL bit but for the P channel. GSTATE indicates the state of the G channel ('00' means UNASSIGNED, '01' means HANDOVER, '10' means CONNECTED (UNLOCKED), and '11' means CONNECTED (LOCKED)). The state diagram of FIG. 8 is applicable to the G channel, but a similar state transition is implemented by the state machine 530 for the P channel.

While in the UNASSIGNED state 810, GU equal 1 (unassigned), GL equals 0 (unlocked), and GSTATE and PSTATE equal '00' (unassigned). From the UNASSIGNED state 810, the state machine 530 can transition to the HANDOVER state 820. In the HANDOVER state, the I/O pin X has been handed over to a peripheral device function and thus the I/O pin is no longer unassigned. The transition between UNASSIGNED state 810 and HANDOVER state 820 can be caused in one of two ways. First, if PU is set equal to 1 (which means the P channel is in the UNASSIGNED state for the I/O pin X) and software issues a write transaction in which the write address is the address of I/O pin X, the G channel state changes from UNASSIGNED state 810 to HANDOVER state 820 if nextGSTATE is set equal to '01' (the state bits within the control register 330) and nextGF is not equal to 0 (i.e., the write data is an address of a peripheral device function and thus not 0). The state machine 820 updates the control register for the I/O pin X to store the identifier for the peripheral device function (following mapping of its address to the identifier) and updates the state bits in the register to '01' to indicate that the state of the G channel is now HANDOVER. At this point, the G channel is in the HANDOVER state for a particular peripheral device function and the P channel is still in the UNASSIGNED state (meaning that no peripheral device function coupled to the P channel multiplexer 710 are has been unassigned to the I/O pin X). While the G channel is in the HANDOVER state 820, GU=0, GL is 0 or 1, and GSTATE is '01'.

Once in the HANDOVER state 820, a transition can occur to either the CONNECTED (UNLOCKED) state 830, the CONNECTED (LOCKED) state 840, or the LOCKED state 850. A transition to the CONNECTED (UNLOCKED) state 830 occurs upon AuthG[X] 511 being asserted by the address authenticator 510 with nextGSTATE='10' and the GL lock bit set to 0. While in the CONNECTED (UNLOCKED) state 830, GU=0, GL=0, and GSTATE='10'. The state machine 530 updates the control register 330 for I/O pin X to specify the G channel state as '10'. The CONNECTED (UNLOCKED) state 830 permits the peripheral device function which has been connected to the I/O pin X to use the I/O pin for transmitting or receiving data.

From the HANDOVER state 820, a transition can occur to the CONNECTED (LOCKED) state 840 occurs upon either AuthG[X] 511 being asserted by the address authenticator 510 or upon nextGSTATE being '11' and the GL lock bit set to 1. While in the CONNECTED (LOCKED) state 840, GU=0, GL=1, and GSTATE='11'. The state machine 530 updates the control register 330 for I/O pin X to specify the G channel state as '11'. The CONNECTED (LOCKED) state 830 permits the peripheral device function which has been connected to the I/O pin X to use the I/O pin for transmitting or receiving data.

The LOCKED state 850 is a state in which the I/O pin is locked but not connected to any peripheral device function. The state machine 530 transitions to the LOCKED state 850 upon AUTHG[X] being asserted by the address authenticator 510 while PU=0 and with nextGSTATE='00', nextGF=0, and nextGU=1. While in this state, PU=0 (assigned), GU=1 (assigned), GL=1 (locked) and GSTATE='00' (unassigned). From the LOCKED state 850, the state machine 530 can transition back to the UNASSIGNED state 810 upon AUTHP[x] being asserted by the address authenticator and nextPU being set to 1 and nextGL being set to 0.

Figure 9:
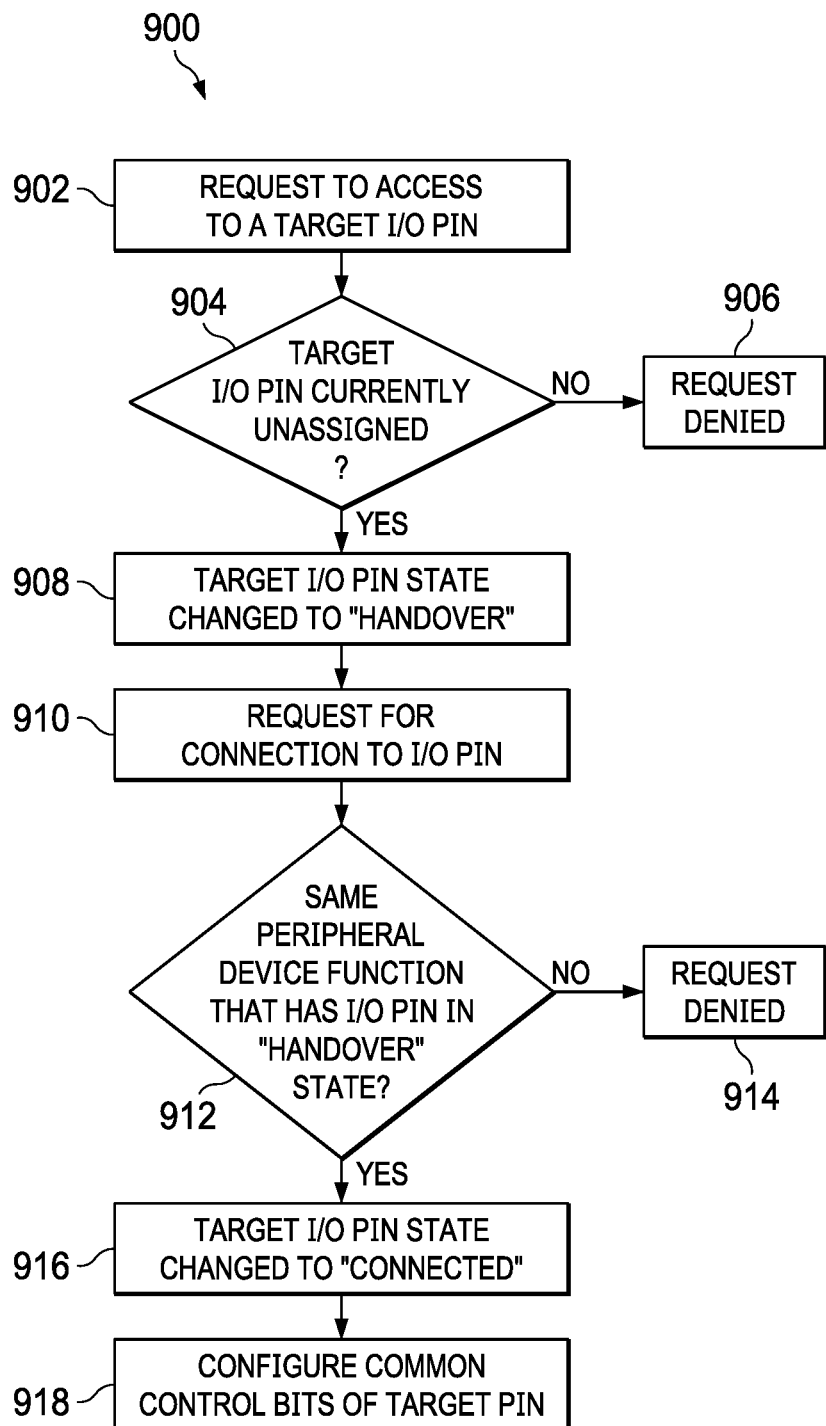
FIG. 9 shows an example method implemented within the I/O multiplexer of FIG. 3.

FIG. 9 is a flow chart illustrating an example method 900. At 902, a request is made to access to a target I/O pin. In one example (and as explained above), this includes a CPU 104 executing one or more machine instructions to perform a write transaction in which the write address is the address of the target I/O pin and the write data includes the address of the peripheral device function.

At 904, a state machine (e.g., state machine 530 in the authenticator 320 of the I/O multiplexer 120) determines whether the target I/O pin is currently in the UNASSIGNED state. This determination is performed by examination of the state bits. If the state bits correspond to the UNASSIGNED state (e.g., 00), then the target I/O pin is determined to be in the UNASSIGNED state. Otherwise, the target I/O pin is determined not to be in the UNASSIGNED state. If the target I/O pin is in the ASSIGNED state (which means assigned to a different peripheral device function), the request is denied at 906. Denial of the request may mean ignoring the request and taking no further action.

If the target I/O pin is currently in the UNASSIGNED state, then control passes to operation 908 and the state of the target I/O pin is changed to the HANDOVER state. This operation may be performed by the state machine 530 updating the state field of the control register 330 for the target I/O pin to specify the HANDOVER state. At 910, a request is made to connect the I/O pin to the peripheral device function specified in the control register 330. This request may be performed by CPU 104 issuing a write transaction in which the write address is the address of the peripheral device function and the write data contains an indication of a CONNECTED state for the I/O pin (e.g., CONNECTED (LOCKED) or CONNECTED (UNLOCKED)). The verification circuit 610 within the address authenticator 510 determines whether the identifier corresponding to the write address matches the identifier currently stored in the I/O pin's control register. If the identifiers do not match, the request is denied at 914. However, if the identifiers match, then control moves to operation 916 in which the state machine 530 changes the state of the I/O pin to one of the CONNECTED states (as specified in the request at operation 910). Subsequently, at operation 918, the common control bits within the control register 330 are configured if the I/O pin is in the CONNECTED state for the given peripheral device function (as ensured by state machine 530).

Figures 10A, 10B, 10C:
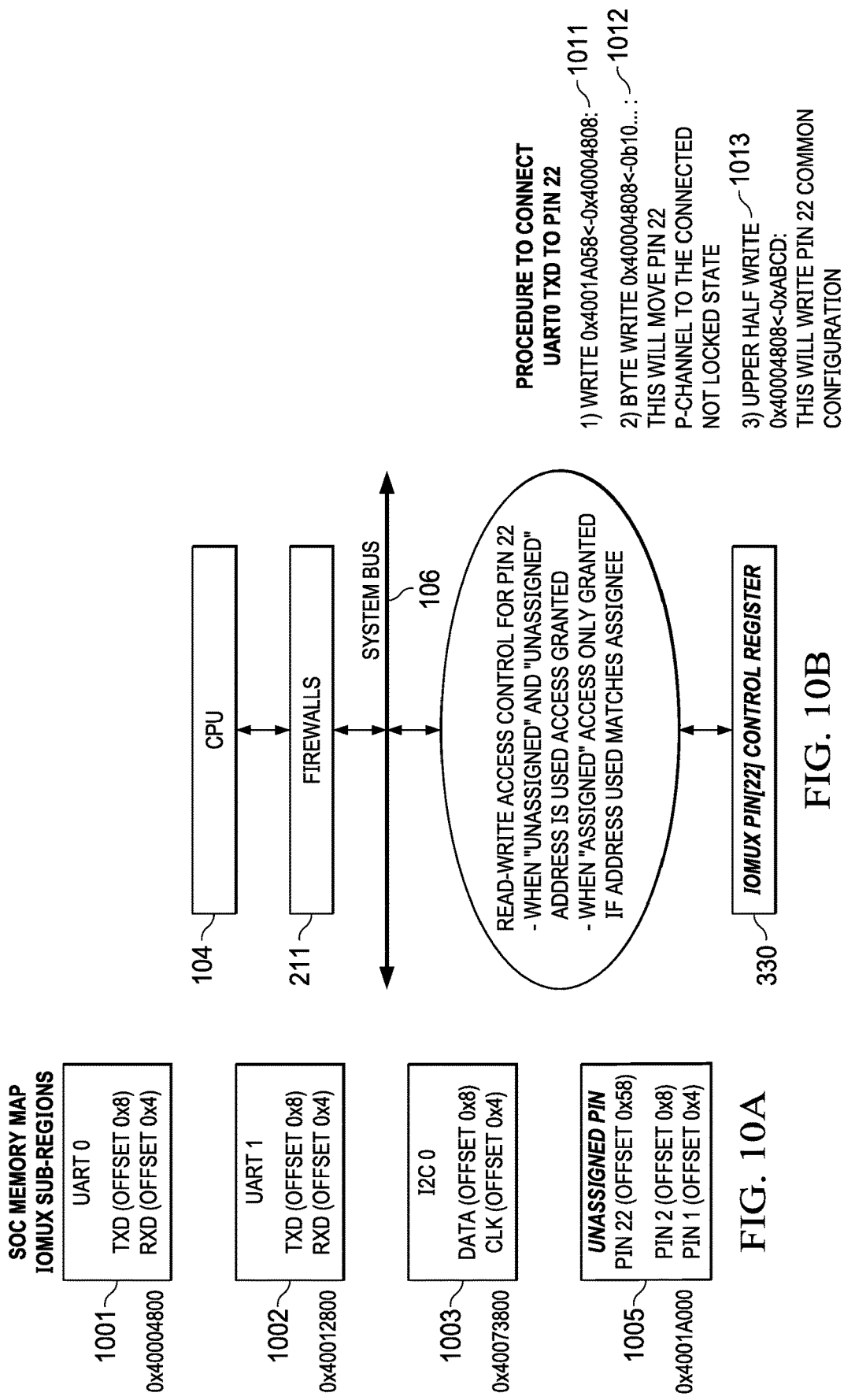
FIGS. 10A-10C shows an example by which a specific peripheral device function connects to a specific I/O pin.

FIGS. 10A, 10B, and 10C shows an example in which a specific peripheral device function connects to a specific I/O pin. Three peripheral devices 1001, 1002, and 1003 are shown as UART 0, UART 1, and I2C 0, respectively. UART 0 has a base address of 0x40004800 and two peripheral device functions—a transmit function (TXD) and a receive function (RXD). The TXD function has an address offset relative to the base address of 0x8 and the RXD's offset is 0x4. Similarly, UART 1 has a base address of 0x40012800 with a TXD offset of 0x8 and RXD offset of 0x4. The I2C's base address is and its two functions and their offsets are DATA (offset 0x8) and CLK (offset I/O pins in the UNASSIGNED state are identified at 1005. The I/O pin address space has a base address of 0x4001A000 and I/O pins 1, 2, and 22 have offsets of 0x4, and 0x58, respectively.

In this example, the UART 0's TXD function initiates a process to connect to I/O pin 22. At step 1011, a write transaction is performed (e.g., by CPU 104) in which the write address is the address of the I/O pin 22 (0x4001A058) and the write data includes the address of UART 0's TXD function (0x40004808). The authenticator 320 responds as explained above and the state machine 530 updates the control register 330 for I/O pin 22 to specify that the state of the I/O pin and the identifier of the corresponding peripheral device function is HANDOVER for the P channel (the G channel is still in the UNASSIGNED state) and the identifier corresponding to UART 0 TXD address 0x40004808.

At step 1012, a write transaction is performed in which the write address is the address of UART 0 TXD (address 0x40004808) and the write data includes bits that encode the next for I/O pin 22 as the CONNECTED (UNLOCKED) state. The firewalls ensure the security of the transaction targeting UART 0 TXD and thus authenticates the transaction at step 1012.

At step 1013, the common control bits for I/O pin 22 are configured through a write transaction in which the write address again is the address of UART 0 TXD (0x40004808) and the write data includes the common control configuration bits. As in step 1012, the firewalls ensure the security of the transaction targeting UART 0 TXD and thus authenticates the transaction at step 1013.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

The invention claimed is:

1. A system comprising:
   a first logic circuit including an input and an output;
   a second logic circuit including an input and an output;
   an input/output (I/O) cell circuit including an input coupled to the output of the first logic circuit, wherein the input of the I/O cell circuit is also coupled to the output of the second logic circuit; and
   a control register including a first field coupled to the input of the first logic circuit, a second field coupled to the input of the second logic circuit.

2. The system of claim 1, wherein the control register further includes a third field coupled to the I/O cell circuit.

3. The system of claim 1, further comprising an authenticator coupled to the first field of the control register.

4. The system of claim 3, wherein the authenticator is coupled to the second field of the control register.

5. The system of claim 3, wherein the authenticator includes compare logic coupled to the control register.

6. The system of claim 5,
   wherein the authenticator is configured to receive an address and convert the address to an identifier, and
   wherein the compare logic is configured to compare the identifier to a value stored in the control register.

7. The system of claim 3, wherein the authenticator is configured to:
   receive a first request to map the I/O cell circuit to a device; and
   update the control register to associate, with the I/O cell circuit, the device specified in the first request.

8. The system of claim 7, wherein the authenticator is configured to:
- responsive to receiving the first request, determine that the I/O cell circuit is not presently mapped to another device; and
- update the control register responsive to determining that the I/O cell circuit is not presently mapped to another device.

9. The system of claim 7, wherein the authenticator is configured to:
- receive a second request for connection of the I/O cell circuit to the device; and
- update the control register to specify a state indicated in the second request.

10. The system of claim 9, wherein the second request includes an address, and wherein the authenticator is configured to:
- determine that the address matches an identifier stored in the control register; and
- responsive to determining that the address matches the identifier, update the control register to specify the state indicated in the second request.

11. The system of claim 3, wherein the authenticator is configured to:
- determine that the first field is set to a connected state;
- allow a high-level secure process to read the I/O cell circuit;
- allow a device that is mapped to the I/O cell circuit to read the I/O cell circuit; and
- prevent all other devices from reading the I/O cell circuit.

12. The system of claim 1, further comprising a multiplexer including:
- a first input coupled to the output of the first logic circuit;
- a second input coupled to the output of the second logic circuit; and
- an output coupled to the input of the I/O cell circuit.

13. The system of claim 1,
- wherein the control register further includes a third field, and
- wherein the system further comprises a first multiplexer including:
  - an output coupled to the first logic circuit; and
  - a select line coupled to the third field of the control register.

14. The system of claim 13,
- wherein the control register further includes a fourth field, and
- wherein the system further comprises a second multiplexer including:
  - an output coupled to the second logic circuit; and
  - a select line coupled to the fourth field of the control register.

15. A system comprising:
- a first logic circuit including an input and an output;
- a second logic circuit including an input and an output;
- an input/output (I/O) cell circuit including an input coupled to the output of the first logic circuit, wherein the input of the I/O cell circuit is also coupled to the output of the second logic circuit;
- an authenticator; and
- a control register including:
  - a first field coupled to the input of the first logic circuit and coupled to the authenticator;
  - a second field coupled to the input of the second logic circuit and coupled to the authenticator; and
  - a third field coupled to the I/O cell circuit.

16. The system of claim 15,
- wherein the authenticator is configured to receive an address and convert the address to an identifier,
- wherein the authenticator includes compare logic coupled to the control register, and
- wherein the compare logic is configured to compare the identifier to a value stored in the control register.

17. The system of claim 15, wherein the authenticator is configured to:
- receive a first request to map the I/O cell circuit to a device; and
- update the control register to associate, with the I/O cell circuit, the device specified in the first request.

18. The system of claim 1, further comprising a multiplexer including:
- a first input coupled to the output of the first logic circuit;
- a second input coupled to the output of the second logic circuit; and
- an output coupled to the input of the I/O cell circuit.

19. The system of claim 1,
- wherein the control register further includes a third field, and
- wherein the system further comprises a first multiplexer including:
  - an output coupled to the first logic circuit; and
  - a select line coupled to the third field of the control register.

20. The system of claim 19,
- wherein the control register further includes a fourth field, and
- wherein the system further comprises a second multiplexer including:
  - an output coupled to the second logic circuit; and
  - a select line coupled to the fourth field of the control register.

* * * * *